US011100203B2

(12) United States Patent
Liau et al.

(10) Patent No.: US 11,100,203 B2
(45) Date of Patent: Aug. 24, 2021

(54) TOUCHSCREEN DISPLAY DEVICE WITH A FINGERPRINT READER

(71) Applicant: ASUSTeK COMPUTER INC., Taipei (TW)

(72) Inventors: Yi-Shiau Liau, Taipei (TW); Ming-Chung Cheng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 31 days.

(21) Appl. No.: 15/974,951

(22) Filed: May 9, 2018

(65) Prior Publication Data
US 2018/0336331 A1 Nov. 22, 2018

(30) Foreign Application Priority Data
May 17, 2017 (TW) .................. 106116352

(51) Int. Cl.
G06F 21/32 (2013.01)
G06F 1/16 (2006.01)
G06F 3/041 (2006.01)
G06K 9/00 (2006.01)

(52) U.S. Cl.
CPC ............ *G06F 21/32* (2013.01); *G06F 1/1626* (2013.01); *G06F 1/1643* (2013.01); *G06F 3/0412* (2013.01); *G06K 9/0004* (2013.01)

(58) Field of Classification Search
CPC ............................. G06F 21/32; G06K 9/0004
See application file for complete search history.

(56) References Cited

U.S. PATENT DOCUMENTS

| 7,953,257 | B2 * | 5/2011 | Chen .................. | G06K 9/00026 |
| | | | | 382/124 |
| 2015/0146944 | A1 * | 5/2015 | Pi ............................ | G06F 21/83 |
| | | | | 382/124 |
| 2015/0195007 | A1 * | 7/2015 | He ...................... | H04B 5/0012 |
| | | | | 455/41.1 |
| 2015/0235071 | A1 | 8/2015 | Chang | |
| 2016/0004899 | A1 * | 1/2016 | Pi ........................ | G06K 9/0002 |
| | | | | 345/173 |
| 2017/0316252 | A1 * | 11/2017 | Yang .................. | G06K 9/00087 |
| 2018/0101254 | A1 * | 4/2018 | Wu ....................... | G06F 1/1626 |
| 2018/0101711 | A1 * | 4/2018 | D'Souza ................ | G06K 9/228 |
| 2019/0196589 | A1 * | 6/2019 | Shim ....................... | G06F 3/016 |

FOREIGN PATENT DOCUMENTS

| CN | 205375501 U | 7/2016 |
| CN | 106249961 A | 12/2016 |
| CN | 106384091 A | 2/2017 |
| TW | 201533444 A | 9/2015 |
| TW | 201640592 A | 11/2016 |
| WO | 2018/045738 A1 | 3/2018 |

* cited by examiner

*Primary Examiner* — William Boddie
*Assistant Examiner* — Bipin Gyawali
(74) *Attorney, Agent, or Firm* — McClure, Qualey & Rodack, LLP

(57) ABSTRACT

The disclosure discloses an electronic device. The electronic device includes a touch module, a fingerprint reader and a display module. The fingerprint reader is disposed on the touch module. The display module is disposed under the touch module. An orthogonal projection of the display module on the fingerprint reader overlaps that of the fingerprint reader.

11 Claims, 6 Drawing Sheets

TOUCHSCREEN DISPLAY DEVICE WITH A FINGERPRINT READER

CROSS-REFERENCE TO RELATED APPLICATION

This application claims the priority benefit of TW application serial No. 106116352, filed on May 17, 2017. The entirety of the above-mentioned patent application is hereby incorporated by references herein and made a part of specification.

BACKGROUND OF THE INVENTION

Field of the Invention

The disclosure relates to an electronic device and, more specifically, to an electronic device with a fingerprint identification module.

Description of the Related Art

The fingerprint identifying technology is widely used at mobile devices since it provides anti-theft function and personal privacy protection function. However, the mobile device becomes smaller and thinner while certain functional components are indispensable. As a result, a configuration of components needs to be adjusted to balance the device size and its performance.

BRIEF SUMMARY OF THE INVENTION

According to a first aspect, an electronic device is provided. The electronic device comprises: a touch module; a fingerprint reader disposed on the touch module, and a display module located under the touch module, wherein an orthogonal projection of the display module on the fingerprint reader overlaps that of the fingerprint reader.

These and other features, aspects and advantages of the present invention will become better understood with regard to the following description, appended claims, and accompanying drawings.

DETAILED DESCRIPTION OF THE EMBODIMENTS

Figure 1A:
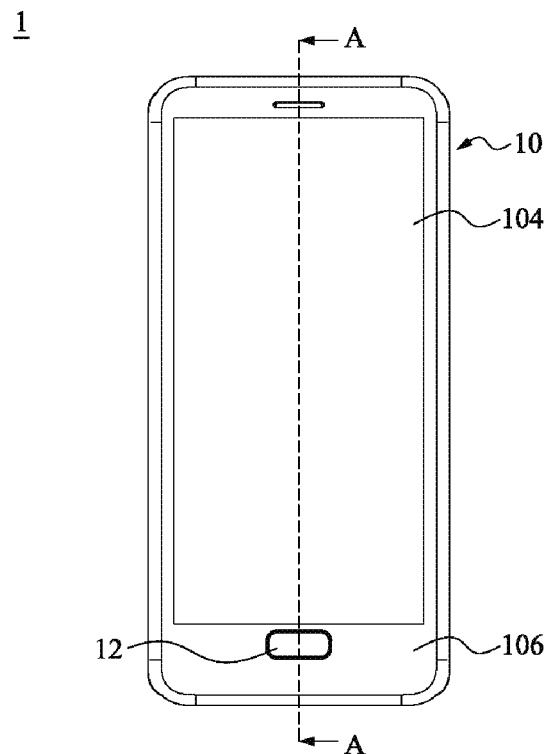
FIG. 1A is a top view diagram showing an electronic device in an embodiment.
Figure 1B:
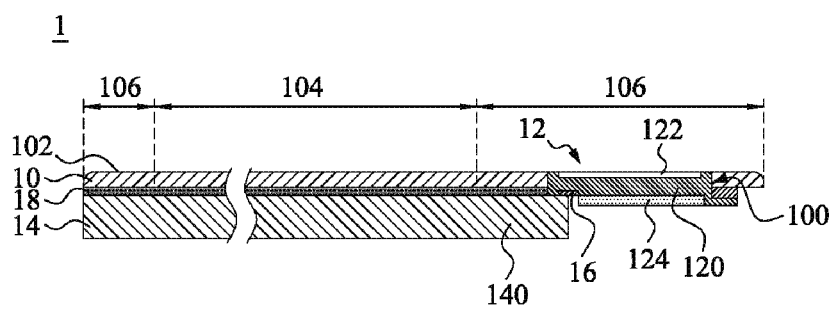
FIG. 1B is a section view of the electronic device in FIG. 1A along a line A-A.

Please refer to FIG. 1A and FIG. 1B. FIG. 1A is a top view diagram showing an electronic device in an embodiment. FIG. 1B is a section view of the electronic device in FIG. 1A along a line A-A. As shown in FIG. 1A and FIG. 1B, in an embodiment, an electronic device 1 includes a touch module 10, a fingerprint reader 12, a display module 14, a virtual key circuit board 16 and an optical adhesive layer 18. In an embodiment, the electronic device 1 is a mobile device, which is not limited herein.

In FIG. 1A and FIG. 1B, the touch module 10 of the electronic device 1 includes a touch surface 102 and an opening 100. The touch module 10 includes a plurality of transparent conductive patterns. The touch module 10 includes a visible area 104 and a non-visible area 106. The touch surface 102 of the touch module 10 is a touch operation surface. In an embodiment, a function layer, such as, a sweat-proof layer, a fingerprint-proof layer, an anti-scratch layer or an anti-glare layer is selected to be disposed on the touch surface 102. In an embodiment, the opening 100 of the touch module 10 is disposed at a peripheral area of the touch module 10, which is not limited herein.

In an embodiment, a material of the transparent conductive pattern of the touch module 10 is indium tin oxide (ITO) or indium zinc oxide (IZO), which is not limited herein. Moreover, the transparent conductive pattern of the touch module 10 is electrically connected to a flexibility circuit board (not shown) via a metal wire (not shown). As a result, when a touch signal is sensed by the transparent conductive pattern of the touch module 10, the touch signal is transmitted to a control chip of the flexibility circuit board via the metal wire. Then, the touch signal is processed.

In an embodiment, the visible area 104 is surrounded by the non-visible area 106 of the touch module 10. The visible area 104 is configured to display information or to be touched to operate the electronic device 1. In an embodiment, the non-visible area 106 is configured to shield wires and other opaque elements.

In FIG. 1A and FIG. 1B, the fingerprint reader 12 is disposed on the non-visible area 106 of the touch module 10. The fingerprint reader 12 includes a protective layer 122, a metal piece 120 and a fingerprint identification chip 124. The protective layer 122 and the fingerprint identification chip 124 are located two opposite sides of the metal piece 120, respectively. Moreover, the protective layer 122 covers the metal piece 120 and the fingerprint identification chip 124. The protective layer 122 is exposed from the opening 100 of the touch module 10. Then, the metal piece 120 and the fingerprint identification chip 124 are protected. The metal piece 120 of the fingerprint reader 12 is embedded into the opening 100 of the touch module 10. When the fingerprint reader 12 is pressed, an impedance of the metal piece 120 is changed. Then, the touch signal is transmitted to the fingerprint identification chip 124. Then, the fingerprint identification chip 124 executes a processing of fingerprint identification. Moreover, in an embodiment, a sensing manner of the fingerprint reader 12 is an optical sensing, an ultrasonic sensing, a silicon wafer sensing pressure sensing, a temperature sensing or a capacitive sensing, which is not limited herein.

In FIG. 1A and FIG. 1B, the display module 14 is disposed under the touch module 10. The display module 14 includes an end 140. An orthogonal projection of the display module 14 on the fingerprint reader 12 is partially overlapped with that of the fingerprint reader 12. That is, the display module 14 is partially covered by the fingerprint reader 12 and is partially overlapped with the opening 100 of the touch module 10.

Further, the end 140 of the display module 14 and the protective layer 122 are located at two opposite sides of the metal piece 120, respectively. The end 140 is partially overlapped with the metal piece 120. Moreover, the end 140 of the display module 14 is adjacent to the fingerprint identification chip 124 of the fingerprint reader 12. That is, the end 140 and the fingerprint identification chip 124 are located on a same side of the metal piece 120. The end 140 of the display module 14 and the fingerprint identification chip 124 are separated from each other by a distance. In an embodiment, orthogonal projections of the touch module 10 and the fingerprint reader 12 on the display module 14 overlap that of the display module 14. That is, the touch module 10 and the fingerprint reader 12 completely cover the display module 14. In an embodiment, the visible area 104 of the touch module 10 is overlapped with a part of the display module 14. The fingerprint reader 12 in the non-visible area 106 is overlapped with the other part of the display module 14.

Since the fingerprint reader 12 in the touch module 10 covers a part of the display module 14, the fingerprint reader 12 is configured flexibly on the touch module 10. Then, the configuration of the display module 14 on the fingerprint reader 12 has fewer limitations.

Moreover, if the fingerprint reader 12 does not cover the display module 14, the configuration of the fingerprint reader 12 is adjacent to an edge of the touch module 10 due to the limit of a width of the non-visible area 106 along a line A-A in the touch module 10. As a result, the fingerprint reader 12 of the electronic device 1 is not easily operated. Consequently, the fingerprint reader 12 cannot read data accurately, and the identification effect is not good. However, if the width of the touch module 10 along the line A-A is increased, the fingerprint reader 12 can be disposed far from the edge of the touch module 10, but the size of the electronic device 1 is increased. As a result, in the embodiment of the disclosure, the fingerprint reader 12 covers at least a part of the display module 14. Then, the fingerprint reader 12 can be disposed far from the edge of the display module 14 without increasing the size of the electronic device 1. Consequently, the fingerprint reader 12 of the electronic device 1 is easily operated, and the identification effect is improved.

Moreover, since the display module 14 is overlapped with the fingerprint reader 12, the overall accommodation space inside the electronic device 1 is increased correspondingly. Thus, more functional components are disposed in the increased accommodation space for broaden the function of the electronic device 1.

In an embodiment, the display module 14 is a liquid crystal display module (LCM) In other embodiments, the display module 14 is a light-emitting diode display module, an organic light-emitting diode (OLED) display module or an electrophoretic display, which is not limited herein.

Figure 6A:
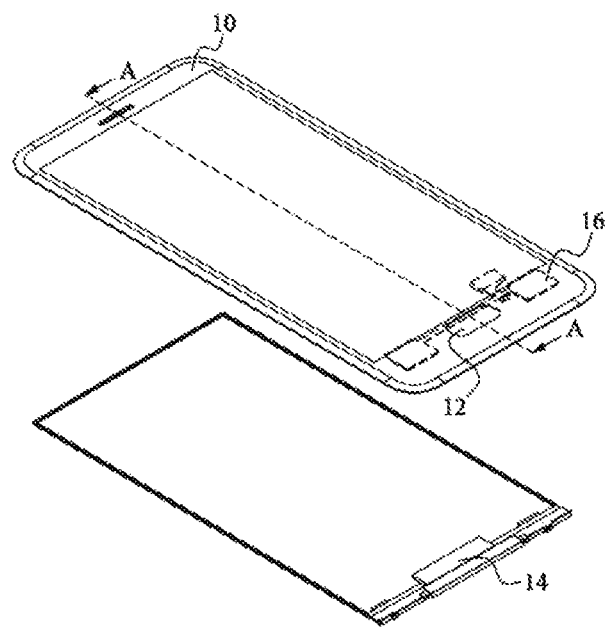

In FIG. 1A and FIG. 1B, part of the virtual key circuit board 16 is located between the touch module 10 and the display module 14 (as shown in FIG. 6A). The other part of the virtual key circuit board 16 is located under the touch module 10 and the fingerprint reader 12 (as shown in FIG. 6A). The optical adhesive layer 18 is disposed between the touch module 10 and the display module 14 to adhere and fix the touch module 10 and the display module 14.

Figure 2:
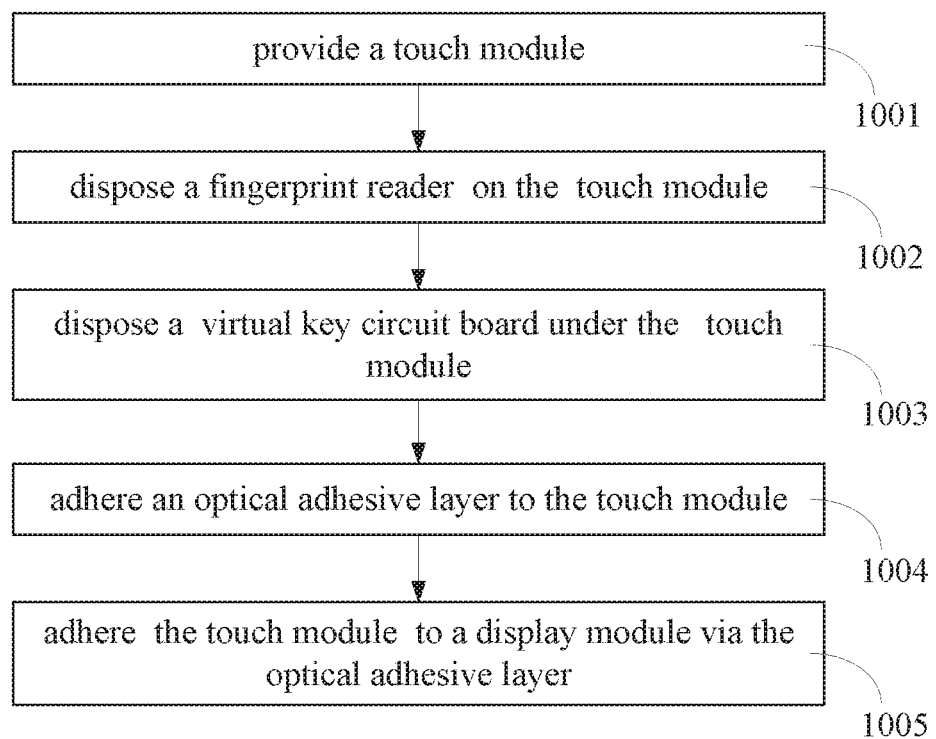
FIG. 2 is a flow chart showing an assembly method of an electronic device in an embodiment.

Please refer to FIG. 2 and FIG. 3A to FIG. 6B. FIG. 2 is a flow chart showing an assembly method of an electronic device in an embodiment. FIG. 3A to FIG. 6B are exploded views and section views of part components of the electronic device 1 in different assembly stages in an embodiment. FIG. 3B, FIG. 4B, FIG. 5B and FIG. 6B are section views of the electronic device 1 in FIG. 3A, FIG. 4A, FIG. 5A and FIG. 6A, respectively, along lines A-A.

The steps of an assembly method of the electronic device 1 illustrated above is not used to limit the invention. The sequence of the steps and the operations are not limited herein. For example, some steps are performed in different orders or performed simultaneously with the other steps. Moreover, some steps or operations are omitted in some embodiments. Further, one or more steps of the disclosure can be separated one or more steps or stages. In an embodiment, an assembly method of the electronic device 1 includes a step S1001 to a step S1005.

Figure 3A:
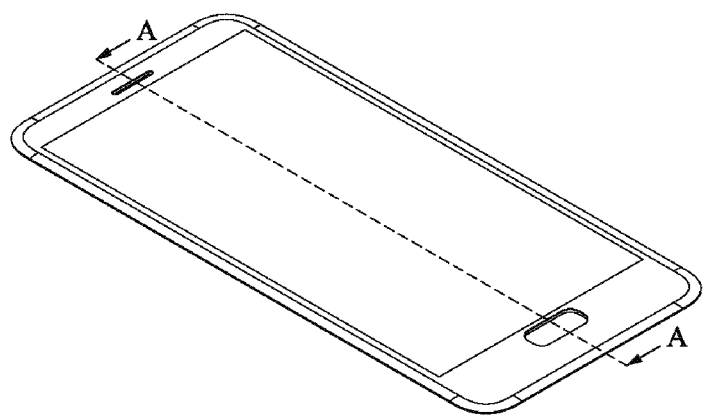
FIG. 3A, FIG. 4A, FIG. 5A and FIG. 6A are exploded views of part components of an electronic device in different assembly stages in an embodiment.
Figure 3B:
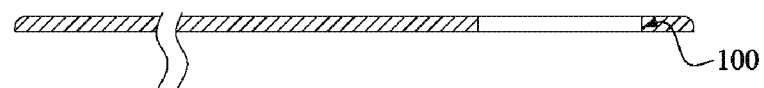
FIG. 3B, FIG. 4B, FIG. 5B and FIG. 6B are section views of an electronic device in FIG. 3A, FIG. 4A, FIG. 5A and FIG. 6A, respectively, along lines A-A in different assembly stages in an embodiment.

In step S1001, a touch module 10 is provided. The opening 100 of the touch module 10 is formed at a peripheral area of the touch module 10, which is not limited herein. FIG. 3A and FIG. 3B correspond to an embodiment of the step S1001.

Figure 4A:
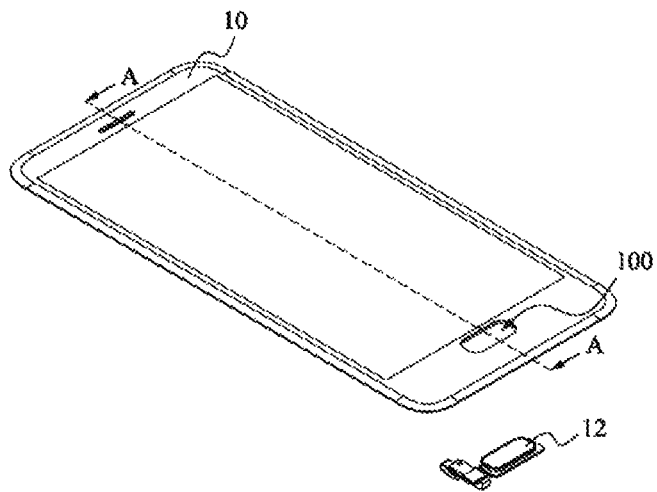
Figure 4B:
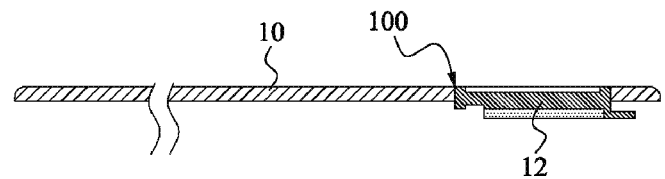

In step S1002, a fingerprint reader 12 is disposed on the touch module 10. In an embodiment, the fingerprint reader 12 is embedded into the opening 100 of the touch module 10. FIG. 4A and FIG. 4B correspond to an embodiment of the step S1002.

Figure 5A:
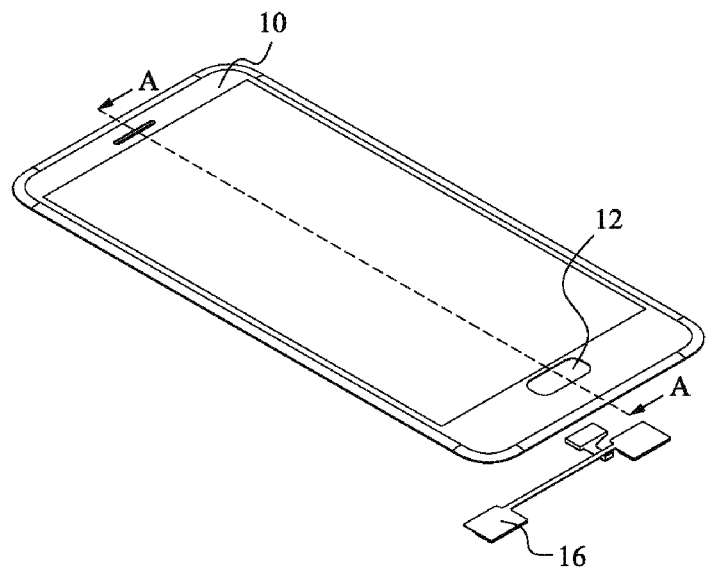
Figure 5B:
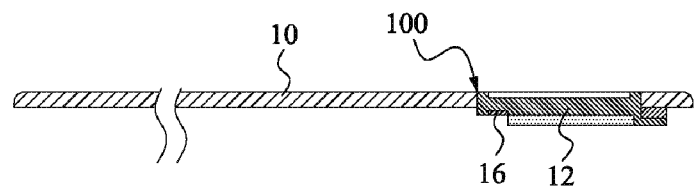

In step S1003, a virtual key circuit board 16 is disposed under the touch module 10. A part of the virtual key circuit board 16 is disposed between the touch module 10 and the display module 14 (as shown in FIG. 6A). In an embodiment, the display module 14 is assembled after the touch module 10. The other part of the display module 14 is disposed under the touch module 10 and the fingerprint reader 12. FIG. 5A and FIG. 5B correspond to an embodiment of the step S1003.

In step S1004, an optical adhesive layer 18 is disposed on the touch module 10 to fix the touch module 10 and the later assembled display module 14.

Figure 6B:
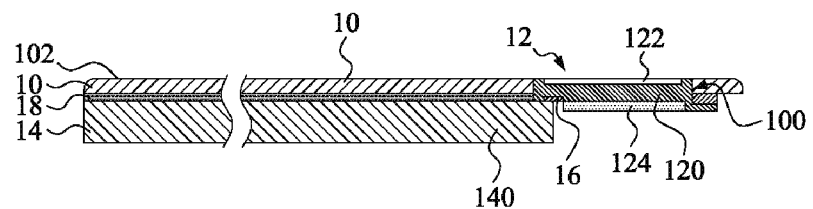

In step S1005, a display module 14 is disposed under the touch module 10. The touch module 10 is adhered to the display module 14 via the optical adhesive layer 18. The display module 14 is configured to be partially overlapped with the fingerprint reader 12. FIG. 6A and FIG. 6B correspond to an embodiment of the step S1005.

In sum, since the fingerprint reader on the touch module of the electronic device covers at least a part of the display module, the fingerprint reader is configured flexibly on the touch module. Moreover, the fingerprint reader covers at least a part of the display module. Then, the fingerprint reader can be disposed far from the edge of the display module without increasing the size of the electronic device. Consequently, the fingerprint reader of the electronic device is easily operated, and the identification effect is improved. Further, since the display module is overlapped with the fingerprint reader, an internal accommodation space of the electronic device is increased correspondingly, and more components can be disposed in the increased accommodation space. Then, the function of the electronic device is increased.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An electronic device, comprising:
   a touch module;
   a fingerprint reader disposed on the touch module and comprising a metal piece and a fingerprint identification chip, wherein the metal piece has a first portion penetrating through the touch module and a second portion laterally extending from a bottommost edge of the first portion along a bottom surface of the touch module toward an outermost edge of the touch module, the fingerprint identification chip is directly below the first portion of the metal piece, a topmost position of the first portion of the metal piece is level with a top surface of the touch module, and a bottommost position of the second portion of the metal piece is level with a bottom surface of the fingerprint identification chip; and a display module located under the touch module, wherein the display module and fingerprint identification chip are located at the same side of the first portion of the metal piece, and a top surface of the fingerprint identification chip and a top surface of the display module are coplanar.

2. The electronic device according to claim 1, wherein orthogonal projections of the touch module and the fingerprint reader on the display module overlap that of the display module.

3. The electronic device according to claim 1, wherein the touch module includes a visible area and a non-visible area, the visible area is surrounded by the non-visible area, the fingerprint reader is disposed on the non-visible area, the visible area is overlapped with a part of the display module, and the fingerprint reader in the non-visible area is overlapped with the other part of the display module.

4. The electronic device according to claim 1, wherein the electronic device further includes a virtual key circuit board, a part of the virtual key circuit board is located between the touch module and the display module, and the other part of the virtual key circuit board is located under the touch module and the fingerprint reader.

5. The electronic device according to claim 1, wherein the electronic device further includes an optical adhesive layer, and the optical adhesive layer is disposed between the touch module and the display module.

6. The electronic device according to claim 1, wherein the fingerprint reader further includes a protective layer, and the protective layer and the fingerprint identification chip are respectively located at two opposite sides of the first portion of the metal piece.

7. The electronic device according to claim 6, wherein the protective layer covers the first portion of the metal piece and the fingerprint identification chip, and the protective layer is exposed from an opening of the touch module.

8. The electronic device according to claim 6, wherein an end of the display module and the protective layer are located at two opposite sides of the first portion of the metal piece, and the end of the display module is partially overlapped with the first portion of the metal piece.

9. The electronic device according to claim 8, wherein the end of the display module is adjacent to the fingerprint identification chip, and the end of the display module and the fingerprint identification chip are separated from each other by a distance.

10. The electronic device according to claim 1, wherein the second portion of the metal piece is spaced apart from and lower than the bottom surface of the touch module.

11. The electronic device according to claim 1, wherein the first portion of the metal piece has a thicker thickness than the fingerprint identification.

* * * * *